(12) United States Patent
Wenz

(10) Patent No.: US 10,717,368 B2
(45) Date of Patent: Jul. 21, 2020

(54) POWER CONTACT HAVING EXCHANGEABLE CONTACT REGION

(71) Applicant: PHOENIX CONTACT E-Mobility GmbH, Schieder-Schwalenberg (DE)

(72) Inventor: Martin Wenz, Bad Pyrmont (DE)

(73) Assignee: PHOENIX CONTACT E-MOBILITY GMBH, Schieder-Schwalenberg (DE)

( * ) Notice: Subject to any disclaimer, the term of this patent is extended or adjusted under 35 U.S.C. 154(b) by 0 days.

(21) Appl. No.: 16/094,301

(22) PCT Filed: Apr. 6, 2017

(86) PCT No.: PCT/EP2017/058209
§ 371 (c)(1),
(2) Date: Oct. 17, 2018

(87) PCT Pub. No.: WO2017/182283
PCT Pub. Date: Oct. 26, 2017

(65) Prior Publication Data
US 2019/0135131 A1    May 9, 2019

(30) Foreign Application Priority Data

Apr. 22, 2016  (DE) ........................ 10 2016 206 914

(51) Int. Cl.
*B60L 53/16*        (2019.01)
*H01R 13/11*        (2006.01)
(Continued)

(52) U.S. Cl.
CPC .............. *B60L 53/16* (2019.02); *H01R 4/308* (2013.01); *H01R 13/111* (2013.01); *H01R 4/56* (2013.01);
(Continued)

(58) Field of Classification Search
CPC ........ H01R 4/308; H01R 4/56; H01R 13/111; H01R 13/424; H01R 13/44; H01R 2201/26; B60L 53/16
See application file for complete search history.

(56) References Cited

U.S. PATENT DOCUMENTS 2,716,737 A * 8/1955 Maberry ................ H01R 13/28
                                                  218/117
2,917,722 A    12/1959 Cobbett et al.
(Continued)

FOREIGN PATENT DOCUMENTS

DE          2652250 A1     9/1977
DE     102012105774 B3    10/2013
(Continued)

*Primary Examiner* — Oscar C Jimenez
(74) *Attorney, Agent, or Firm* — Occhiuti & Rohlicek LLP

(57) ABSTRACT

The invention relates to a power contact (10) for a charging plug (100) and/or for a charging socket, wherein the power contact (10) has a first connection region (21) for galvanically connecting to an electrical energy receiver or energy transmitter, and a second connection region (31) for galvanically connecting to a charging line (120), wherein the power contact (10) is characterised by the following features: the power contact (10) is formed as two parts and has a base component (30) and a contacting component (20) that can be connected to the base component (30), wherein the contacting component (20) is designed such that it can be detached from the base component (30), such that the contacting component (20) of the power contact (10) can be exchanged; the first connection region (21) is arranged in the contacting component (20) and the second connection region (31) is arranged in the base component (30); and, when connecting the contacting component (20) to the base component (30), the first connection region (21) and the second connection region (31) are galvanically connected.

18 Claims, 4 Drawing Sheets

Figure 1:
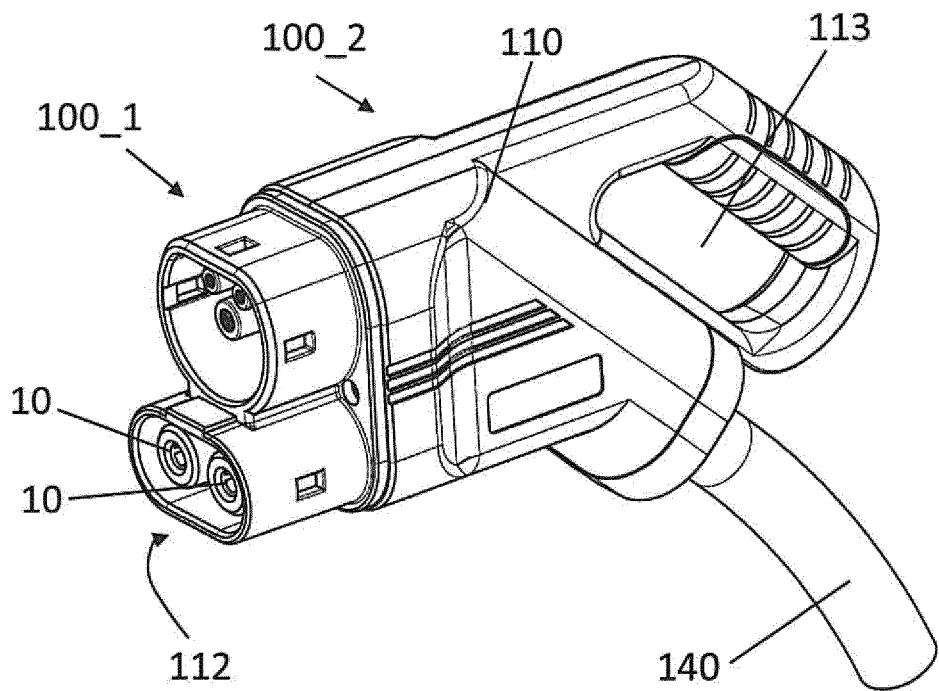

(51) Int. Cl.
*H01R 4/30* (2006.01)
*H01R 13/424* (2006.01)
*H01R 13/44* (2006.01)
*H01R 4/56* (2006.01)

(52) U.S. Cl.
CPC ............ *H01R 13/424* (2013.01); *H01R 13/44* (2013.01); *H01R 2201/26* (2013.01)

(56) References Cited

U.S. PATENT DOCUMENTS

| | | | | |
|---|---|---|---|---|
| 3,748,632 | A * | 7/1973 | Tanges, Jr. ............. | H01R 13/18 439/686 |
| 4,072,394 | A | 2/1978 | Waldron et al. | |
| 4,170,393 | A * | 10/1979 | Mocek, Jr. ............. | H01R 13/42 439/601 |
| 4,944,686 | A * | 7/1990 | Gertz ................... | H01R 4/5033 439/175 |
| 5,113,101 | A * | 5/1992 | Liu .................... | H01R 13/5221 174/75 D |
| 5,358,433 | A * | 10/1994 | Dechanteloup ....... | H01R 13/111 439/843 |
| 5,516,310 | A | 5/1996 | Sawada | |
| 5,791,919 | A * | 8/1998 | Brisson ................. | H01R 27/00 439/166 |
| 6,077,132 | A * | 6/2000 | Gligorijevic ............ | H01R 4/56 439/891 |
| 6,102,751 | A * | 8/2000 | Becker .................. | H01R 13/42 439/784 |
| 6,129,568 | A * | 10/2000 | Mercurio ............... | H01R 11/12 439/166 |
| 6,220,902 | B1 | 4/2001 | Ivandic et al. | |
| 6,328,615 | B1 * | 12/2001 | Safai ..................... | H01R 13/03 439/825 |
| 6,644,993 | B2 * | 11/2003 | Victor ................... | H01R 27/00 439/175 |
| 7,329,156 | B2 * | 2/2008 | Wells ................... | H01R 13/639 439/738 |
| 2009/0090517 | A1 | 4/2009 | Jackson et al. | |
| 2017/0279210 | A1 * | 9/2017 | Kraemer ............... | H01R 13/506 |

FOREIGN PATENT DOCUMENTS

| | | |
|---|---|---|
| DE | 102014103864 | 9/2015 |
| DE | 102014103864 A1 | 9/2015 |
| EP | 0025368 A1 | 3/1981 |
| EP | 0 574 293 A1 | 12/1993 |
| EP | 0574293 A1 | 12/1993 |
| EP | 1 130 697 A2 | 9/2001 |
| EP | 1130697 A2 | 9/2001 |
| EP | 2854222 A1 | 1/2015 |
| EP | 2854222 A1 | 4/2015 |
| FR | 2692080 A1 | 10/1993 |
| FR | 2692080 A1 | 12/1993 |
| JP | S52104753 A | 9/1977 |
| JP | S5636878 A | 4/1981 |
| JP | H06325811 A | 11/1994 |
| JP | 5759819 B2 | 8/2015 |

\* cited by examiner

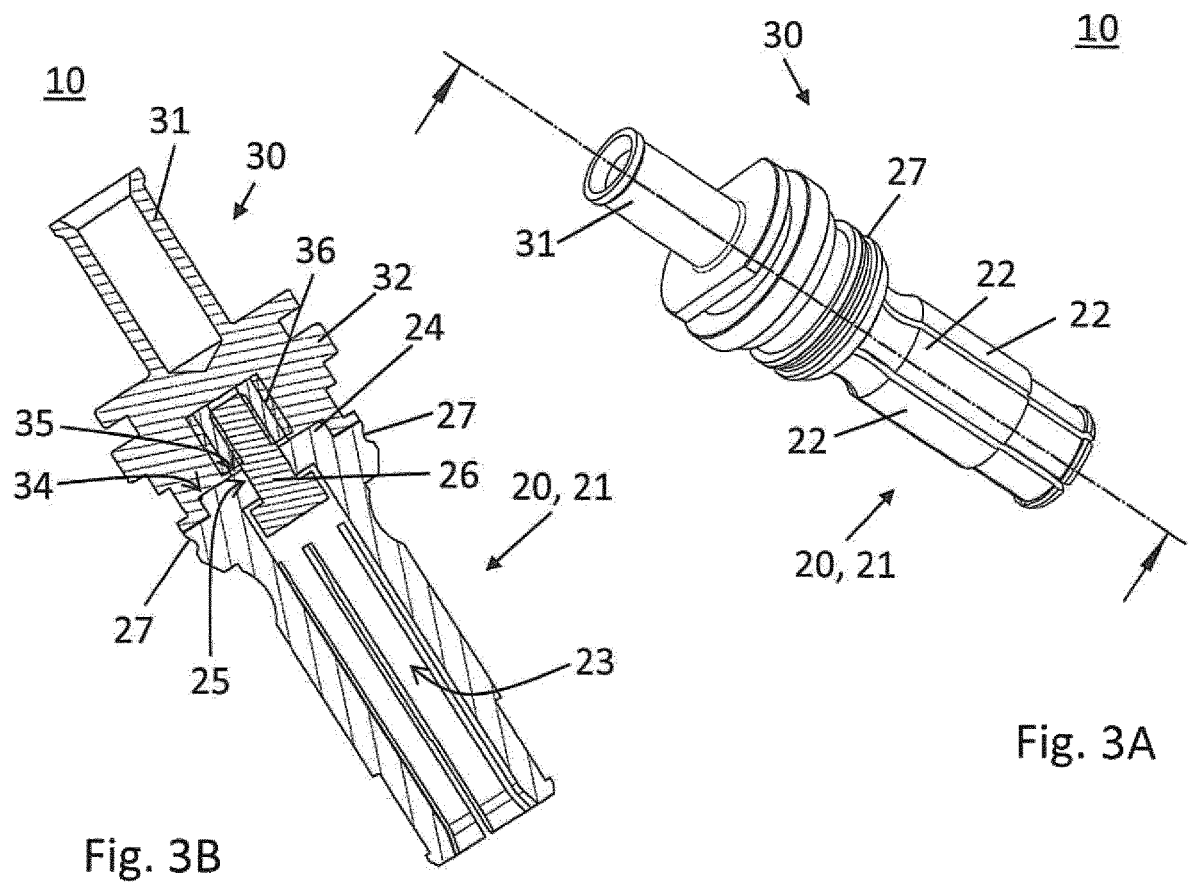
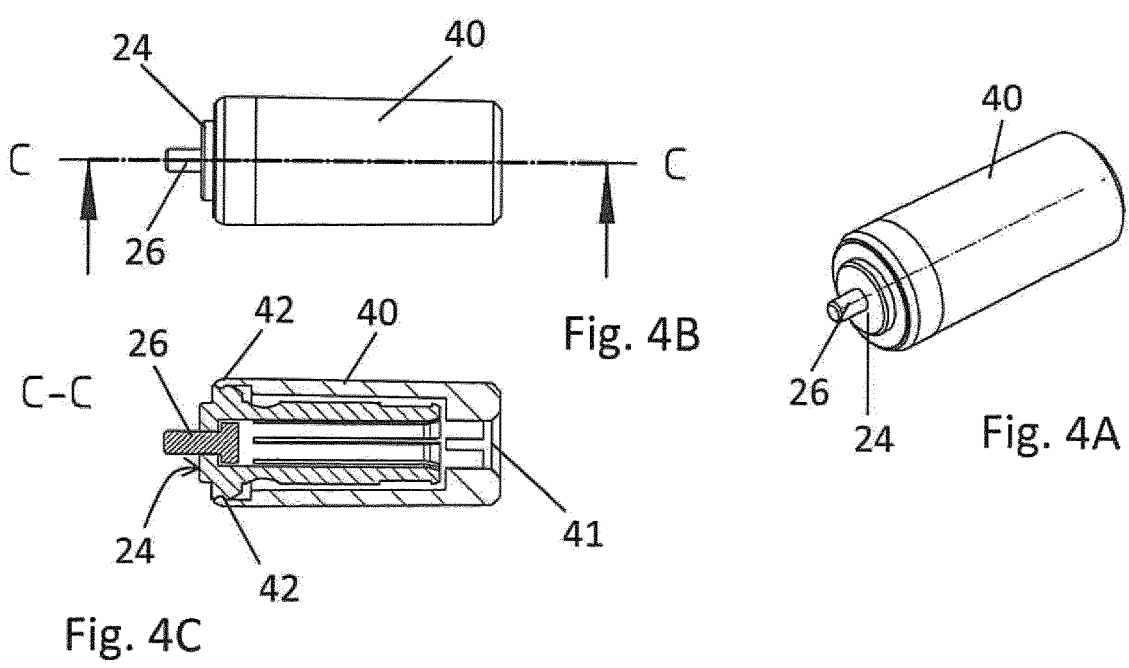

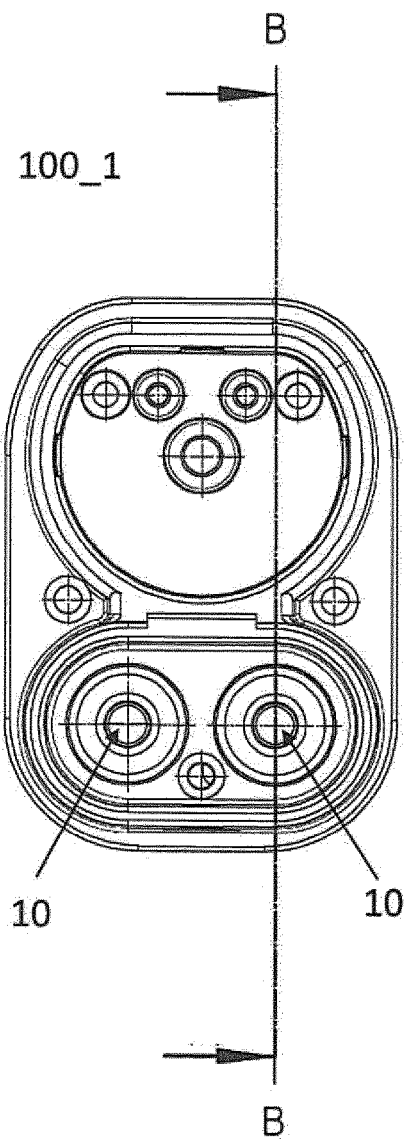
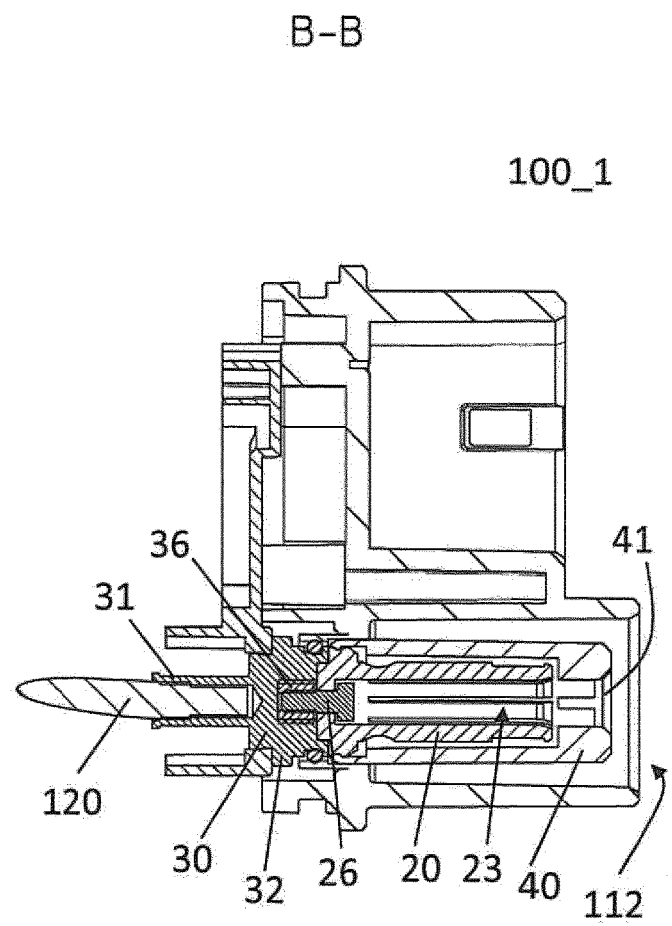
Fig. 5A
Fig. 5B

POWER CONTACT HAVING EXCHANGEABLE CONTACT REGION

CROSS-REFERENCE TO RELATED APPLICATIONS

This application is a U.S. National Stage of International Application No. PCT/EP2017/058209, filed on Apr. 6, 2017, which claims the priority of German Application No. 102016206914.4, filed Apr. 22, 2016. The contents of each of the above-referenced applications is incorporated herein by reference in its entirety.

The present invention relates to a power contact for a charging plug and/or for a charging socket. The present invention further relates to a charging plug for coupling to a corresponding connecting apparatus and for transmitting electrical energy.

Charging plugs for vehicles that can be electrically driven are known from the prior art, which charging plugs are configured for connection to a corresponding connecting apparatus, formed as a socket. In this respect, reference is made to the charging plug disclosed in DE 10 2012 105 774 B3. Power contacts, which each have a first connection region and a second connection region, are arranged in the charging plug. The first connection region is formed as a contact socket and is suitable for galvanic connection to a contact pin, wherein the contact pin is galvanically connected to an electrical energy receiver, for example a rechargeable battery of a vehicle. However, there is also a possible configuration in which a contact socket is connected to the rechargeable battery, wherein, in this case, the first connection region is then formed as a contact pin. The second connection region of the power contact is formed for galvanic connection to an electrical energy source, for example a charging station or, in general, to an electrical power supply network. For this purpose, the second connection region is fixedly connected to a charging line.

The charging plug is electrically coupled to a charging station, which can be available to the public, for example, so that a multiplicity of vehicles that can be electrically driven can be charged one after the other by means of the charging station. The power contacts of the charging plug are subjected to great loading and consequently a great amount of wear on account of frequent charging processes and the couplings and isolations with vehicle-side charging sockets or charging pins necessary for said charging processes.

The present invention is based on the object of providing an improved power contact for a charging plug and/or for a charging socket and an improved charging plug, which take into account the problem described above.

The object on which the present invention is based is achieved by a power contact having the features of claim 1. Advantageous refinements of the power contact are described in the claims that are dependent on claim 1. The object on which the present object is based is further achieved by a charging plug having the features of claim 9.

More specifically, the object on which the present invention is based is achieved by a power contact for a charging plug and/or for a charging socket, which power contact has a first connection region for galvanic connection to an electrical energy receiver or energy transmitter and a second connection region for galvanic connection to a charging line. The power contact according to the invention is characterized in that the power contact is of at least two-part form and has a base component and contact-making component that can be connected to the base component, wherein the contact-making component is formed so as to be releasable from the base component so that the contact-making component of the power contact can be exchanged. In this case, the first connection region is arranged in the contact-making component, and the second connection region is arranged in the base component. When the contact-making component is connected to the base component, the first connection region and the second connection region are in galvanic contact.

In the case of power contacts and charging plugs, in which said power contacts are installed, known from the prior art, the charging plug has to be at least partly dismantled in order to exchange the power contacts, wherein the worn power contacts are able to be separated from the charging lines and the new power contacts have to be electrically connected to the charging lines.

This procedure is time-consuming and costly. The power contact according to the invention affords the advantage that the entire power contact does not have to be exchanged when the power contact is worn due to use. By means of the power contact according to the invention, only the contact-making component has to be separated or released from the base component and replaced with a new contact-making component, which is connected to the base component remaining in the charging plug. As a result, the time required to exchange a worn power contact is significantly reduced owing to the power contact according to the invention. The maintenance costs for a charging plug fitted with the power contact or a charging socket fitted with the power contact are furthermore reduced owing to the power contact according to the invention.

The base component can also be referred to as base element. The contact-making component can also be referred to as contact-making element.

The first connection region of the power contact has a first contact area and the second connection region of the power contact has a second contact area. The contact-making component defines the first connection region of the power contact, and the base component defines the second connection region of the power contact.

The base component is provided to be built into a charging plug and to be galvanically connected to a charging line. Releasing or separating the contact-making component from the base component means galvanic separation of the contact-making component from the base component.

The power contact is preferably formed in such a way that the contact-making component has a first connecting device and the base component has a second connecting device so that the contact-making component can be connected to the base component by means of the first connecting device and by means of the second is connecting device.

The first connecting device can be formed, for example, as an external thread on the contact-making component and the second connecting device can be formed, for example, as an internal thread in the base component. Furthermore, it is also possible for the contact-making component to be connected to the base component by means of a bayonet connection. There are therefore no restrictions with respect to the first connecting device and the second connecting device.

The power contact is further preferably formed in such a way that the first connecting device is formed as a screw or as a threaded pin and the second connecting device is formed as a threaded sleeve having an internal thread, wherein the screw or the threaded pin can be screwed into the threaded sleeve.

A correspondingly formed power contact is particularly simple in terms of its design. Furthermore, a reliable connection of the contact-making component to the base component is achieved by means of correspondingly formed connecting devices since the contact-making component remains reliably on the base component even in the case of intense mechanical loading on account of a corresponding formation of the connecting devices. Furthermore, given a corresponding formation of the first connecting device and of the second connecting device, a release of the contact-making component from the base component is possible in a particularly simple manner.

The screw can naturally be screwed into the threaded sleeve so that the contact-making component is then connected to the base component. The screw can preferably be connected to the contact-making component in a captive manner.

According to a further advantageous refinement, the power contact is formed in such a way that the screw or the threaded pin is arranged inside a holding space of the contact-making component and protrudes through a passage opening of the contact-making component.

A screw head of the screw is then arranged inside the holding space and engages behind a wall, in which the passage opening of the contact-making component is introduced. When the contact-making component is connected to the base component, the longitudinal axes of the base component and of the contact-making component preferably run in a collinear manner with respect to one another.

The power contact is further preferably formed in such a way that the contact-making component is formed as a contact socket.

According to a further advantageous refinement, the power contact has an insulation sleeve, which in turn has a front-side passage opening, which can be connected to the contact-making component, wherein, when the insulation sleeve is connected to the contact-making component, the contact-making component is enclosed by the insulation sleeve and accessible via the passage opening of the insulation sleeve.

The insulation sleeve consists in this case of a dielectric material, that is to say of an electrically insulating material. A correspondingly formed power contact affords the advantage that the first connection region of the power contact does not have to be touched when the contact-making component is exchanged, with the result that there is no or reduced contact corrosion.

The power contact is preferably formed in such a way that the is power contact has an at least partly circumferential groove or an at least partly circumferential elevation and the insulation sleeve has an at least partly circumferential latching contour so that the insulation sleeve can be connected to the contact-making component through engagement of the latching contour into the groove or engagement into the elevation or engagement behind the elevation. The latching contour can also be referred to as latching spring.

The correspondingly formed power contact affords the advantage that the connection of the insulation sleeve to the contact-making component is possible in a particularly simple manner. It is furthermore possible, when exchanging a contact-making component, to release the insulation sleeve from the worn contact-making component and to connect it to a new contact-making component, which replaces the old contact-making component.

As an alternative to this kind of fastening of the insulation sleeve to the contact-making component, it is also possible for the insulation sleeve to have an internal thread arranged on the end side and for the contact-making component to have a corresponding external thread, likewise arranged on the end side, so that the insulation sleeve can be screwed onto the contact-making component.

According to a further advantageous refinement of the power contact, the base component has a front-side depression and the contact-making component has a projection that can be inserted into the depression, wherein, when the contact-making component is connected to the base component, the contact-making component is connected to the base component in a form-fitting manner by virtue of the projection being arranged inside the depression.

According to a further advantageous refinement of the power contact, the contact-making component has a front-side depression and the base component has a projection that can be inserted into the depression, wherein, when the contact-making component is connected to the base component, the contact-making component is connected to the base component in a form-fitting manner by virtue of the projection being arranged inside the depression.

In the case of a correspondingly formed power contact, the connection between the contact-making component and the base component is formed so as to be further reinforced. Furthermore, a reliable galvanic contact of the contact-making component with the base component is ensured by a corresponding formation of the power contact. Furthermore, a contact area between the contact-making component and the base component is increased.

The object on which the present invention is based is further achieved by a charging plug for coupling to a corresponding connecting apparatus and for transmitting electrical energy, wherein the charging plug is characterized in that said charging plug has at least one above-described power contact, which is arranged in a charging plug housing, wherein the second connection region of the power contact is galvanically connected to a charging line, and wherein the first connection region of the power contact is accessible via a contact side of the charging plug housing.

Figure 2:
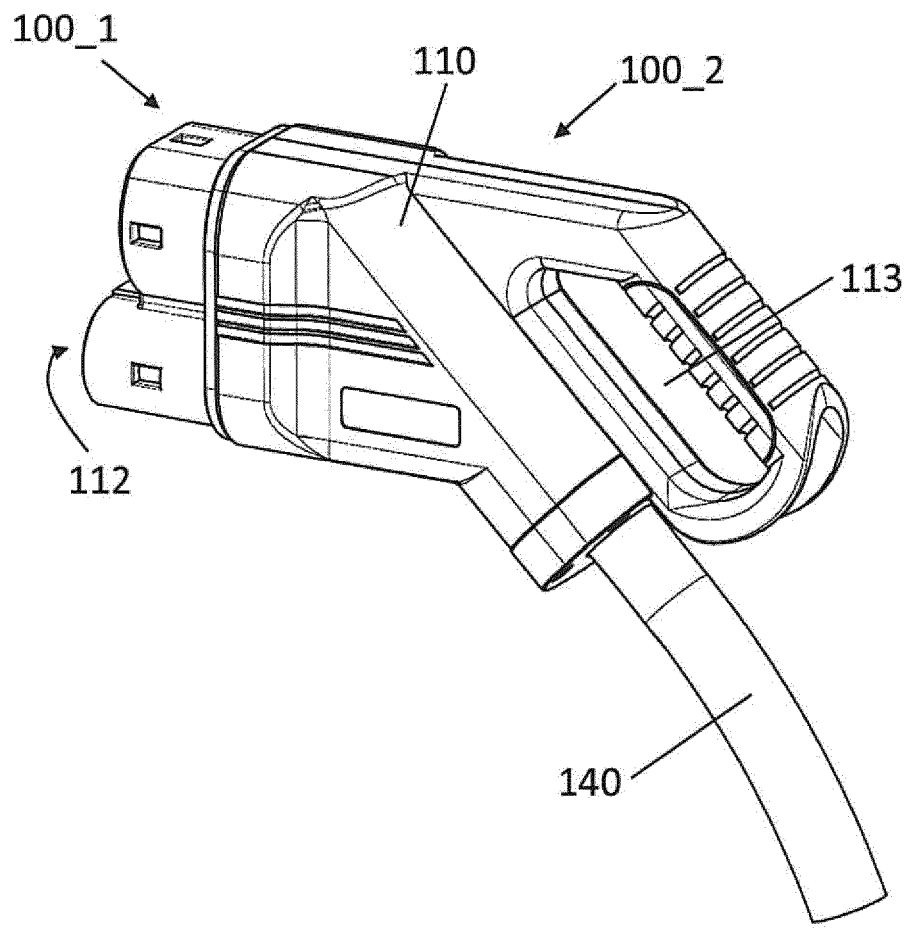
Figure 6A:
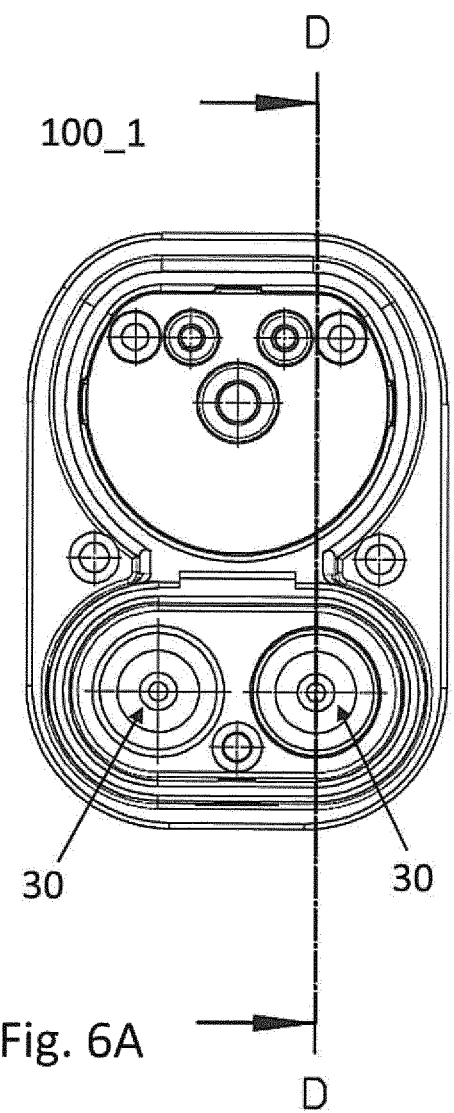
Figure 6B:
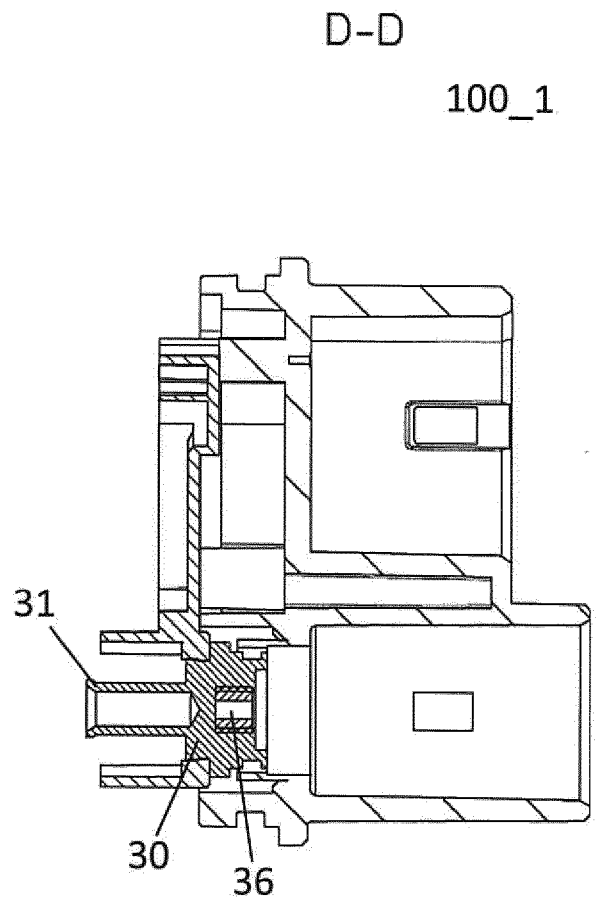
Figure 7A:
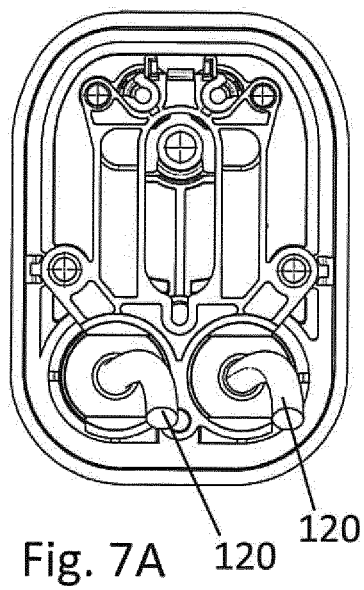
Figure 7B:
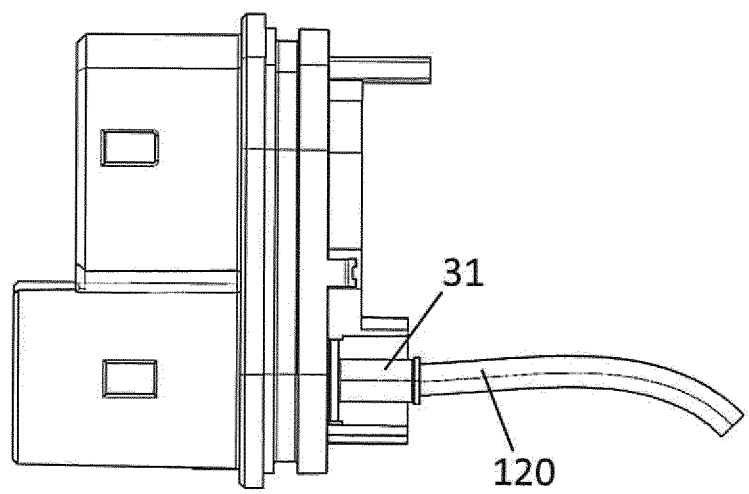

Further advantages, details and features of the invention subsequently result from the exemplary embodiments explained. In this case, in detail:

FIG. 1: shows a perspective illustration of a charging plug according to the invention viewed obliquely from the front;

FIG. 2: shows the charging plug illustrated in FIG. 1 viewed obliquely from behind;

FIG. 3A: shows a perspective illustration of a power contact according to the invention;

FIG. 3B: shows a cross-sectional illustration of the power contact shown in FIG. 3A;

FIG. 4A: shows a perspective illustration of a contact-making component of the power contact according to the invention;

FIG. 4B: shows a side view of the contact-making component shown in FIG. 4A;

FIG. 4C: shows a cross-sectional illustration of the contact-making component shown in FIG. 4B;

FIG. 5A: shows a front view of a front-side region of the charging plug shown in FIGS. 1 and 2;

FIG. 5B: shows a sectional illustration of the front-side region of the charging plug shown in FIG. 5A;

FIG. 6A: shows the front-side region of the charging plug shown in FIG. 5A having a dismantled contact-making component;

FIG. 6B: shows a sectional illustration of the front-side region of the charging plug shown in FIG. 6A;

FIG. 7A: shows a rear view of the front-side region of the charging plug shown in FIGS. 5A to 6B; and FIG. 7B: shows a side view of the front-side region of the charging plug shown in FIG. 7A.

In the description that now follows, the same reference signs are used to denote identical components or identical features, such that a description given regarding a component with reference to one figure also applies to the other figures, such that a repeated description will be omitted. Furthermore, individual features that have been described in connection with one embodiment can also be used separately in other embodiments.

FIGS. 1 and 2 illustrate a charging plug 100 according to the invention for coupling to a corresponding connecting apparatus (not illustrated in the figures) and for transmitting electrical energy. The illustrated charging plug 100 is a charging plug 100 for the so-called combined AC/DC charging system, which is a charging plug system for electric vehicles according to IEC 62196, and supports AC charging (alternating current) and DC charging (direct current). The combined AC/DC charging system essentially consists of a vehicle-side socket, the so-called inlet, and the charging plug 100.

As can be seen from FIGS. 1 and 2, the charging plug 100 has a charging plug housing 110, in which a handle 113 for handling the charging plug 100 is formed. The charging plug 100 is connected on the end side to a charging cable 140, which can also be referred to as power supply cable 140, by means of which the charging plug 100 is connected or can be connected to a charging station (not illustrated). A front-side contact side 112 of the charging plug 100 can be inserted into a charging socket (not illustrated), for example of an electrically operated motor vehicle. The charging plug 100 has a front-side region 100_1 and a rear-side region 100_2. As can be seen from FIG. 1, two power contacts 10 are accessible via the contact side 112 of the charging plug 100.

In FIGS. 3A and 3B, a power contact 10 according to the invention is illustrated. In this case, FIG. 3A is a perspective illustration of the power contact 10 and FIG. 3B illustrates the power contact 10 in section. The power contact 10 according to the invention has a first connection region 21 for galvanic connection to an electrical energy receiver and a second convection region 31 for galvanic connection to a charging line 120 (see FIGS. 5B, 7A, 7B). The power contact 10 according to the invention is of two-part form and has a base component 30 and a contact-making component 20 that can be connected to the base component 30 and which, in FIGS. 3A and 3B, is connected to the base component. The contact-making component 20 is in this case formed so as to be releasable from the base component 30 so that the contact-making component 20 of the power contact 10 can be exchanged. The base component 30 has a fastening device 32 formed as a fastening flange 32, by means of which the base component 30 can be connected to the charging plug housing 110.

The first connection region 21 of the power contact is arranged in this case in the contact-making component 20, and the second connection region 31 of the power contact 10 is arranged in the base component 30. In the state in which the contact-making component 20 is connected to the base component 30, which state is illustrated in FIGS. 3A and 3B, the first connection region 21 and the second connection region 31 are in galvanic contact.

In terms of the material selection of the contact-making component 20 and of the base component 30, there are no restrictions at all, as long as the contact-making component 20 and the base component 30 are electrically conductive.

The contact-making component 20 is connected to the base component 30 by means of a first connecting device 26 formed as a screw 26 and by means of a second connecting device 36 formed as a threaded sleeve 36 having an internal thread. In this case, the screw 26 is arranged inside a holding space 23 contact-making component 20 and protrudes through a passage opening 25 of the contact-making component 20. Screwing the screw 26 into the threaded sleeve 36 achieves a reliable connection of the contact-making component 20 to the base component 30.

It is also clear from FIGS. 3A and 3B that the base component 30 has a front-side depression 34 and the contact-making component 20 has a projection 24. In the exemplary embodiment illustrated, the front-side depression 34 is formed as a cylindrical depression 34, and the projection 24 is formed as a cylindrical projection 24. Screwing the projection 24 into the front-side depression 34 of the contact-making component 20 achieves a form-fitting connection of the contact-making component 20 to the base component 30.

The contact-making component 20 is of segmented design. To this end, the contact-making component 20 has a multiplicity of longitudinal recesses so that the contact-making component 20 has a number of shell segments 22 that corresponds to the number of longitudinal recesses. In the exemplary embodiment illustrated, the shell segments 22 are formed as cylindrical shell segments 22. The radial spacings of the cylindrical shell segments 22 are variable with respect to one another, that is to say the individual cylindrical shell segments 22 can be pressed apart from one another so as to increase the longitudinal recesses when, for example, the contact-making component 20 or the first convection region 21 is slid onto a contact pin (not illustrated in the figures), which is provided, for example, on the vehicle side. This achieves a reliable electrical/galvanic connection between the first connection region 21 of the contact-making component 20 and the contact pin.

In the exemplary embodiment illustrated, the second connection region 31 of the base component 30 is formed as a contact-making sleeve 31, in the interior of which a charging line 120 can be held. FIG. 5B illustrates a charging line 120 making contact with the base component 30.

It is clear from FIGS. 4A, 4B and 4C that the power contact 10 can furthermore have an insulation sleeve 40. The insulation sleeve 40 consists in this case of a dielectric material—that is to say of an electrically insulating material. To connect the insulation sleeve 40 to the contact-making component 20, the contact-making component 20 has a groove 27, which is circumferential in the exemplary embodiment illustrated. The insulation sleeve 40 has a latching contour 42, formed as circumferential in the exemplary embodiment illustrated, which can also be referred to as a latching spring 42. As a result, the insulation sleeve 40 can be connected to the contact-making component 20 through engagement of the latching spring 42 into the groove 27. In the state in which the insulation sleeve 40 is connected to the contact-making component 20, the contact-making component 20 is also accessible via a passage opening 41 of the insulation sleeve 40.

In FIGS. 5A and 5B, a front-side region 100_1 is illustrated. In this case, the contact-making component 20 is connected to the base component 30, and the contact-making component 20 is accessible via the passage opening 41 of the insulation sleeve 40. As a result, the power contact 10 can be galvanically connected to an energy receiver by means of the contact side 112 of the charging plug 100.

In FIGS. 6A and 6B, the front-side region 100_1 is illustrated, wherein the contact-making component 20 is removed from the charging plug 100. In this state, the charging plug 100 can be provided with a new contact-making component 20. In FIG. 7A, one the front-side region 100_1 is illustrated as viewed from a rear side, and in FIG. 7B, the front-side region 100_1 is illustrated in a side view.

LIST OF REFERENCE SIGNS

10 Power contact
20 Contact-making component (of the power contact)
21 First connection region/contact socket (of the power contact)
22 Shell segment/cylindrical shell segment (of the contact-making component)
23 Holding space (of the contact-making component)
24 (Cylindrical) projection (of the contact-making component)
25 Passage opening (of the contact-making component)
26 First connecting device/screw
27 Groove (of the contact-making component)
30 Base component (of the power contact)
31 Second connection region (of the power contact)
32 Fastening device/fastening flange (of the base component)
34 (Cylindrical) front-side depression (of the base component)
35 Passage opening (of the base component)
36 Second connecting device/threaded sleeve (of the base component)
40 Insulation sleeve
41 Passage opening (of the insulation opening)
42 Latching contour/latching spring (of the insulation sleeve)
100 Charging plug/plug connector
100_1 Front-side region (of the charging plug)
100_2 Rear-side region (of the charging plug)
110 Charging plug housing
112 Contact side (of the charging plug housing)
113 Handle (of the charging plug housing)
120 Charging line (of the charging plug)
140 Charging cable/power supply cable

The invention claimed is:

1. A power contact for a charging plug and/or for a charging socket, wherein the power contact comprising a first connection region for galvanic connection to an electrical energy receiver or energy transmitter and a second connection region for galvanic connection to a charging line, wherein the power contact is of two-part form and has a base component and a contact-making component that can be connected to the base component, wherein the contact-making component is formed so as to be releasable from the base component so that the contact-making component of the power contact can be exchanged;
    the first connection region is arranged in the contact-making component and the second connection region is arranged in the base component;
    when the contact-making component is connected to the base component, the first connection region and the second connection region are in galvanic contact;
    wherein the power contact includes a first connecting device and a second receiving device, the first connecting device having been received by the contact-making component and the second connecting device having been received by the base component so that the contact-making component can be connected to the base component by means of the first connecting device and by means of the second connecting device; and
    wherein the first connecting device is formed as a screw or as a threaded pin and the second connecting device is formed as a threaded sleeve having an internal thread, wherein the screw or the threaded pin can be screwed into the threaded sleeve.

2. The power contact as claimed in claim 1, wherein the screw or the threaded pin is arranged inside a holding space of the contact-making component and protrudes through a passage opening of the contact-making component.

3. The power contact as claimed in claim 2, wherein the following features:
    the contact-making component has a front-side depression and the base component has a projection that can be inserted into the depression; and
    when the contact-making component is connected to the base component the contact-making component is connected to the base component in a form-fitting manner by virtue of the projection being arranged inside the depression.

4. The power contact as claimed in claim 2, wherein the contact-making component is formed as a contact socket.

5. The power contact as claimed in claim 1, wherein the contact-making component is formed as a contact socket.

6. The power contact as claimed in claim 1, wherein the following features:
    the power contact has an insulation sleeve having a front-side passage opening, which can be connected to the contact-making component; and
    when the insulation sleeve is connected to the contact-making component, the contact-making component is enclosed by the insulation sleeve and accessible via the passage opening of the insulation sleeve.

7. The power contact as claimed in claim 6, wherein the contact-making component has an at least partly circumferential groove or an at least partly circumferential elevation and the insulation sleeve has an at least partly circumferential latching contour so that the insulation sleeve can be connected to the contact-making component through engagement of the latching contour into the groove or engagement into the elevation or engagement behind the elevation.

8. The power contact as claimed in claim 1, wherein the following features:
    the base component has a front-side depression and the contact-making component has a projection that can be inserted into the depression; and
    when the contact-making component is connected to the base component, the contact-making component is connected to the base component in a form-fitting manner by virtue of the projection being arranged inside the depression.

9. The power contact as claimed in claim 1, wherein the following features:
    the contact-making component has a front-side depression and the base component has a projection that can be inserted into the depression; and
    when the contact-making component is connected to the base component, the contact-making component is connected to the base component in a form-fitting manner by virtue of the projection being arranged inside the depression.

10. A charging plug for coupling to a corresponding connecting apparatus and for transmitting electrical energy, wherein the charging plug has at least one power contact as claimed in claim 1 and which is arranged in a charging plug housing wherein the second connection region of the power contact is galvanically connected to a charging line, and wherein the first connection region of the power contact is accessible via a contact side of the charging plug housing.

11. The charging plug as claimed in claim 10, wherein the contact-making component is formed as a contact socket.

12. The charging plug as claimed in claim 10, wherein the following features:
- the power contact has an insulation sleeve having a front-side passage opening, which can be connected to the contact-making component; and
- when the insulation sleeve is connected to the contact-making component, the contact-making component is enclosed by the insulation sleeve and accessible via the passage opening of the insulation sleeve.

13. The charging plug as claimed in claim 12, wherein the contact-making component is formed as a contact socket.

14. The charging plug as claimed in claim 13, wherein the following features:
- the power contact has an insulation sleeve having a front-side passage opening, which can be connected to the contact-making component; and
- when the insulation sleeve is connected to the contact-making component, the contact-making component is enclosed by the insulation sleeve and accessible via the passage opening of the insulation sleeve.

15. The charging plug as claimed in claim 13, wherein the following features:
- the base component has a front-side depression and the contact-making component has a projection that can be inserted into the depression and
- when the contact-making component is connected to the base component, the contact-making component is connected to the base component in a form-fitting manner by virtue of the projection being arranged inside the depression.

16. The charging plug as claimed in claim 13, wherein the following features:
- the contact-making component has a front-side depression and the base component has a projection that can be inserted into the depression; and
- when the contact-making component is connected to the base component the contact-making component is connected to the base component in a form-fitting manner by virtue of the projection being arranged inside the depression.

17. The charging plug as claimed in claim 10, wherein the following features:
- the base component has a front-side depression and the contact-making component has a projection that can be inserted into the depression and
- when the contact-making component is connected to the base component, the contact-making component is connected to the base component in a form-fitting manner by virtue of the projection being arranged inside the depression.

18. The charging plug as claimed in claim 10, wherein the following features:
- the contact-making component has a front-side depression and the base component has a projection that can be inserted into the depression; and
- when the contact-making component is connected to the base component the contact-making component is connected to the base component in a form-fitting manner by virtue of the projection being arranged inside the depression.

\* \* \* \* \*